United States Patent [19]

Jatkar

[11] Patent Number: 5,788,412
[45] Date of Patent: Aug. 4, 1998

[54] METHOD FOR IN SITU CONTAMINANT EXTRACTION FROM SOIL

[76] Inventor: Jayant Jatkar, 1335 Hunter Cir., Naperville, Ill. 60540

[21] Appl. No.: 749,800

[22] Filed: Nov. 15, 1996

[51] Int. Cl.⁶ .................................................. B09C 1/06
[52] U.S. Cl. ........................ 405/128; 166/272.1; 405/131
[58] Field of Search .............................. 166/57, 272.1, 166/302, 370; 405/128, 131; 588/900

[56] References Cited

U.S. PATENT DOCUMENTS

| | | | |
|---|---|---|---|
| 5,076,727 | 12/1991 | Johnson et al. | 405/131 X |
| 5,098,538 | 3/1992 | Kim et al. | 405/128 X |
| 5,114,497 | 5/1992 | Johnson et al. | 405/128 X |
| 5,169,263 | 12/1992 | Johnson et al. | 405/128 |
| 5,271,693 | 12/1993 | Johnson et al. | 405/131 X |
| 5,360,067 | 11/1994 | Meo, III | 405/131 X |
| 5,564,861 | 10/1996 | Khudenko | 405/128 |
| 5,660,500 | 8/1997 | Marsden, Jr. et al. | 405/131 X |

*Primary Examiner*—George A. Suchfield
*Attorney, Agent, or Firm*—Douglas B. White

[57] ABSTRACT

The present invention involves heating of sub-surface soil by use of conduction heating intermediate the injection and extraction wells of a vacuum extraction system. This conduction heating is accomplished by implanting heat exchange units, such as a circulating hot oil system, into the soil between the injection and extraction wells.

3 Claims, 2 Drawing Sheets

METHOD FOR IN SITU CONTAMINANT EXTRACTION FROM SOIL

BACKGROUND OF THE INVENTION

1. Field of the Invention

This invention relates generally to remediation of contaminated soil, and more particularly to treatment of contaminated soil (biological and organic) by a thermally enhanced contaminant recovery method.

2. Description of the Prior Art

Soil excavation has been the traditional method for decontaminating a site with absorbed hydrocarbon contamination. Besides being costly, excavating the soil merely changes its location to hazardous waste sites. Alternatively, soil ventilation has been developed for locations where contamination has not reached ground water. An extraction (recovery) well in the nature of a vertical pipe is placed and sealed into the soil with a perforated section at its lower end. By use of a blower or vacuum pump, sub atmospheric pressure is applied to the pipe to draw contaminant vapor and air from the extraction well. The vapor is condensed in the heat exchanger and collected in the receiver for disposal, while the air is passed through valves to a carbon filtering system where it can be expelled or recirculated. Alternatively, air can be recirculated, via a bypass route, directly to a reinjection well of a configuration similar to the extraction well.

More recently, the in situ treatment of soil has been carried out by use of neutralizing chemicals and solvents. Particularly, solvents may be injected into the soil to enhance contaminant solubility, and methods have been proposed to heat the soil using steam or radio waves (U.S. Pat. No. 4,670,634) to cause the chemicals to evaporate, whereupon the vapors are drawn off.

Additionally, in U.S. Pat. No. 5,181,796 a method is proposed for injecting hot exhaust gas into the soil from an internal combustion engine to vaporize the contaminants; and in U.S. Pat. No. 5,076,727, RF heating is proposed in combination with vapor flushing in a vacuum extraction system.

Steam heat has been employed to extract volatile as well as non-volatile contaminants. In U.S. Pat. No. 5,018,576 steam is injected and a vacuum is drawn at an extraction well arranged to draw steam horizontally through the contaminated soil. In U.S. Pat. No. 5,009,266 the steam injection is pulsatile to thereby increase the rate of mass transfer during vacuum extraction of mobilizable contaminants in the soil.

Prior art heating techniques have not produced satisfactory results, and the use of injected steam is discouraged as it tends to spread the contamination.

SUMMARY OF THE INVENTION

The present invention involves the heating of sub-surface soil by use of conduction heating intermediate the injection and extraction wells of a vacuum extraction system. This conduction heating is accomplished by implanting heat exchange units, such as piping of a circulating hot oil system, in the contaminated soil between the injection and extraction wells.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
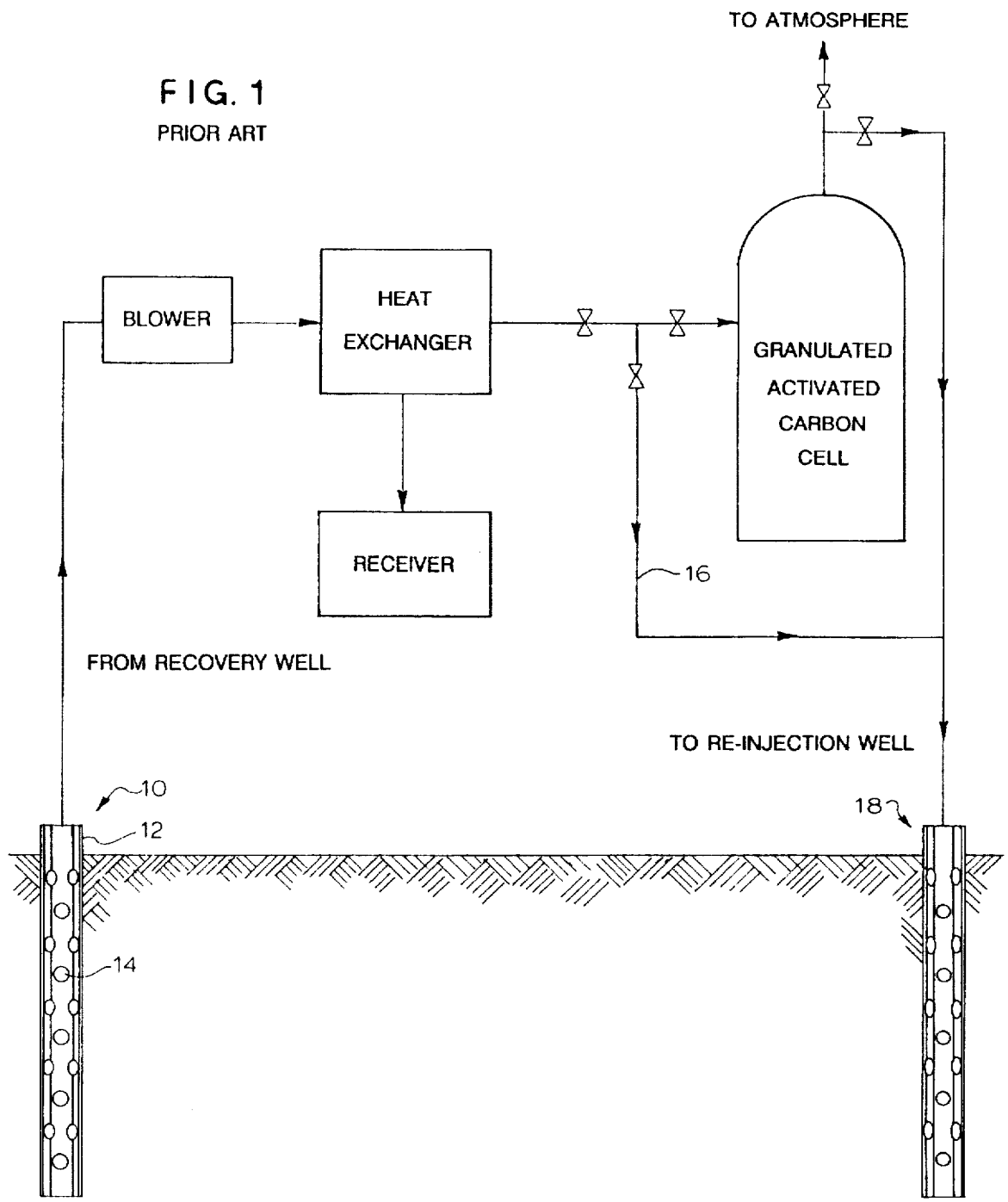
FIG. 1 depicts a typical vacuum extraction system of the prior art.

Turning first to FIG. 1 there is shown a typical prior art vacuum recovery system. An extraction (recovery) well 10 in the nature of a vertical pipe 12 is placed and sealed into the soil with a perforated section 14 at its lower end. By use of a blower or vacuum pump, sub atmospheric pressure is applied to the pipe to draw contaminant vapor and air from the extraction well. This extracted vapor is condensed in the heat exchanger and contaminants are collected in the receiver for disposal, while the air is passed through valves to a carbon filtering system after which it can be expelled. Alternatively, the filtered air can be recirculated, via a bypass route 16, directly to a reinjection well 18 of a configuration similar to the extraction well.

Figure 2:
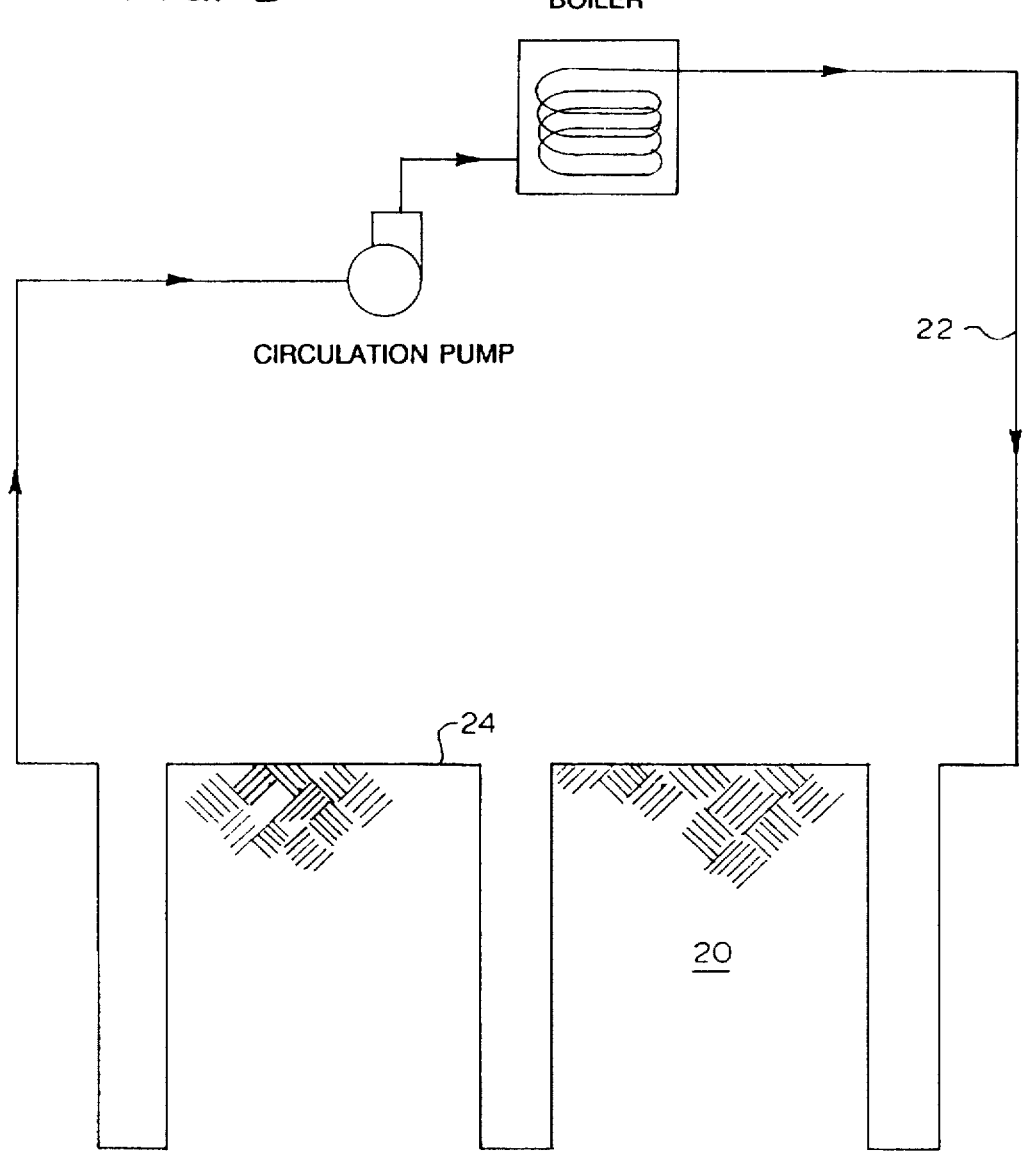
FIG. 2 is a block diagram depicting a conduction heating system interposed between the injection and extraction wells of the vacuum extraction system of FIG. 1.

In accordance with the preferred embodiment of this invention, the extraction process is accelerated by the addition of the heating system shown in FIG. 2. This system is interposed between reinjection and extraction (recovery) wells to heat sub-surface soil 20 by means of thermal conduction. In the preferred embodiment, fluids such as oil, water, steam or ethylene glycol are heated with a boiler, or other heat exchange techniques, and then pumped through piping 22 to heat exchange devices 24 inserted in thermal contact with the sub-surface soil 20. In one version of this invention, these heat exchange devices simply comprise piping, and due to the isolation of the heated fluid from the soil, no increase in contamination is caused by this heating technique. Additionally, due to the high heat obtainable (approximately 700 degrees F.) contaminants such as gasoline can be stripped out of the soil in approximately 2–4 weeks, compared to the 1–2 years required without this heating.

From the foregoing description, it will be apparent that modifications can be made to the apparatus and method for using same without departing from the teachings of the present invention. Accordingly, the scope of the invention is only to be limited as necessitated by the accompanying claims.

I claim:

1. A method for the in situ removal of contaminants from sub-surface soil comprising the steps of:
   constructing an injection well;
   constructing an extraction well;
   constructing a heat exchange device inserted into the soil intermediate said injection well and said extraction well for heating the soil therebetween by thermal conduction, wherein said heat exchange device includes means for circulating heated fluid into thermal contact with said sub-surface soil.

2. The method for the in situ removal of contaminants from soil of claim 1 wherein said heat exchange device comprises piping inserted into said sub-surface soil and means to heat and circulate fluid therethrough.

3. The method for the in situ removal of contaminants from soil of claim 2 wherein said circulated fluid comprises oil.

* * * * *